United States Patent [19]

Buschmeier

[11] Patent Number: 4,693,231
[45] Date of Patent: Sep. 15, 1987

[54] GEARLIKE, ABRASIVE PRECISION WORKING TOOL, A METHOD FOR DRESSING OF SUCH A TOOL AND A DRESSING TOOL FOR DRESSING THE TOOL

[75] Inventor: Dieter Buschmeier, Kirchheim, Fed. Rep. of Germany

[73] Assignee: Carl Hurth Maschinen- und Zahnradfabrik GmbH & Co., Munich, Fed. Rep. of Germany

[21] Appl. No.: 799,539

[22] Filed: Nov. 19, 1985

[30] Foreign Application Priority Data

Nov. 23, 1984 [DE] Fed. Rep. of Germany ....... 3442830

[51] Int. Cl.⁴ .............................................. B24B 53/00
[52] U.S. Cl. ........................... 125/116 D; 51/105 GG; 51/287
[58] Field of Search ............................ 125/11 CD, 39; 51/206 P, 206.5, 287, 95 GH, 105 GG, 105 H

[56] References Cited

U.S. PATENT DOCUMENTS

| 1,639,471 | 8/1927 | Shafer | 51/95 GH |
| 3,417,510 | 12/1968 | Wildhaber | 51/95 GH |
| 3,550,330 | 12/1970 | Nakamura | 51/287 |
| 3,602,209 | 8/1971 | Bocker | 51/287 |
| 4,175,537 | 11/1979 | Wiener | 125/11 CD |
| 4,475,319 | 10/1984 | Witz | 51/287 |
| 4,602,458 | 7/1986 | Erhardt et al. | 51/95 GH |

FOREIGN PATENT DOCUMENTS 210855  6/1984  Fed. Rep. of Germany ........ 51/105 GG Primary Examiner—Harold D. Whitehead
Attorney, Agent, or Firm—Flynn, Thiel, Boutell & Tanis

[57] ABSTRACT

A narrow guide gear is mounted on an axially facing side of a gear-shaped tool. The tool effects a precision working of the flanks of gearlike workpieces. The teeth of the tool have an abrasive surface, that is a surface which does not have uniformly directed cutting edges. During dressing of the tool tooth flanks with a gear-shaped dressing tool, the guide gear mates with a guide pinion which is arranged next to the dressing tool. Adjusting structure is provided for relatively rotatably connecting the precision working tool and the guide gear to one another, so that during dressing a forced guiding of the dressing tool exists.

6 Claims, 3 Drawing Figures

GEARLIKE, ABRASIVE PRECISION WORKING TOOL, A METHOD FOR DRESSING OF SUCH A TOOL AND A DRESSING TOOL FOR DRESSING THE TOOL

FIELD OF THE INVENTION

The invention relates to a gearlike tool for the precision working of the flanks of gears, the teeth of which have an abrasive surface free of any uniformly directed cutting edges, a method for dressing said tool and a dressing tool for dressing said tool.

BACKGROUND OF THE INVENTION

The invention thus is based on gearlike abrasive tools, as they are generally known for the precision working of the flanks of gears (U.S. Pat. No. 3,092,934, German OS No. 27 19 524). For dressing of the tool tooth flanks, one generally used a dressing tool having a gearlike constructed base member, the tooth flanks of which are coated with CBN or diamond granules. Precision working tool and dressing tool are for this purpose brought into a mating mesh. If work is thereby done without backlash, then forces act onto both sides of the teeth which are in mesh, which forces—depending on how many flanks are participating momentarily in the engagement—change constantly. These changing forces cause errors on the flanks of the precision tool, which are later transferred onto the tools which are to be worked thereby. Whereas if dressing is done with the single-flank contact, then the dressing tool so to speak follows the flank errors which exist on the precision working tool and does not eliminate them.

Therefore, the basic purpose of the invention is to improve the dressing task in such a manner that up to now occurring shortcomings are avoided. Furthermore, the precision working tool which is to be dressed and the dressing tool are designed such that they can be utilized for facilitating an improved dressing method.

To attain the aforesaid purpose, a precision working tool is provided wherein at least one guide gear is arranged next to the tool in axial direction. An adjusting device is provided for relatively rotatably connecting the tool and the guide gear together, the guide gear engaging during dressing of the tool tooth flanks a guide pinion arranged in axial direction next to a dressing tool and is connected thereto by structure preventing a relative rotation therebetween. A corresponding dressing tool is provided wherein at least one guide pinion is arranged in axial direction next to the dressing tool and is fixedly connected against relative rotation, the guide pinion engaging a guide gear arranged in axial direction next to a precision working tool which is to be dressed. Adjusting structure is provided for relatively rotatably connecting the tool and the guide gear together. The dressing itself occurs then according to a method explained in greater detail hereinbelow. Compared with the up to now common dressing, the inventive method is characterized by providing between the precision working tool which is to be dressed and the dressing tool backlash, however, the dressing itself occurs without backlash. Since the guide gear and the guide pinion can be manufactured very precisely, a very good flank shape on the precision working tool is produced during dressing, because the shape of the guide gear flanks is transferred onto the precision working tool.

The use of guide gears is known for the precision working of gears from U.S. application Ser. No. 576,672, filed Feb. 3, 1984, which application was abandoned in favor of U.S. application Ser. No. 816,946, filed Jan. 6, 1986 and assigned to the same assignee as the present invention. The machine on which this precision working is carried out must, however, be set up for the coaxial receiving of the guide gear pair and must have the necessary devices in order to be able to change the flank contact in the guide gear pair and in the tool-workpiece pair. Whereas, in the inventive precision working tool, the dressing tool and the inventive dressing method can be used or carried out on each known gear precision working machine.

U.S. application Ser. No. 664,811, filed Oct. 25, 1984 which application was abandoned in favor of U.S. application Ser. No. 853,088, filed Apr. 17, 1986 and assigned to the same assignee as the present invention, discloses a dressing tool which is fixedly connected to a guide gear, which dressing tool also engages the tooth system of a gearlike tool which is to be dressed. The guide gear serves the purpose of replacing the teeth which are missing in the dressing tool. Through its engagement with the tool gear tooth system it is exposed to a certain wear. This known guide gear therefore cannot be compared neither from its purpose nor from its operation with the inventive arrangement of the guide gears.

The precision working tool with its guide gear and/or the dressing tool with its guide pinion can, depending on the workpieces which are to be worked, have the shape of straight or helically toothed spur gears or of straight or spirally toothed bevel gears; they also can be internally toothed.

The number of teeth on the precision working tool and of the dressing tool does not need to correspond with the number of teeth on the guide gears. It can even be more favorable if they are different, because possibly existing pitch errors are then compensated for. It is only important that the two gear ratios are the same. If, for example, the precision working tool has 105 teeth and the dressing tool 39 teeth, then the guide gears must not have the same tooth counts. They may then for example have 70 and 26 teeth, which results in the same gear ratio.

If the dressing of the precision working tools occurs on a machine in which the tool and the workpiece approach one another in axial direction and are brought into meshing engagement, then it is preferable, in order to protect the axial tooth edges, to slope or round the edges, depending on the direction of movement.

BRIEF DESCRIPTION OF THE DRAWINGS

The invention will be described in greater detail hereinafter with reference to the exemplary embodiment illustrated in three figures, namely.

DETAILED DESCRIPTION

Figure 1:
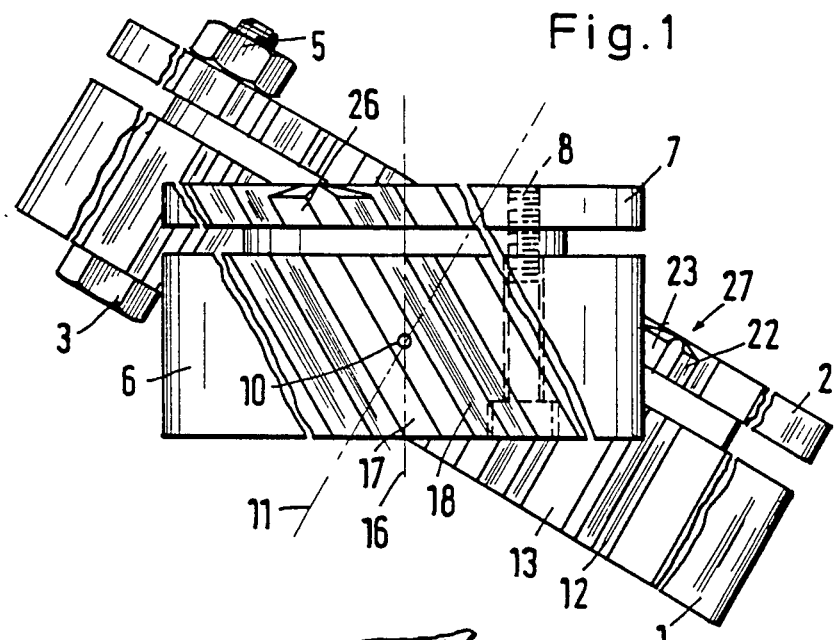
FIG. 1 illustrates a view of a precision working tool and a dressing tool with the associated guide gear and guide pinion.

A narrow guide gear 2 is secured on an axially facing side thereof to the opposing axially facing side of a gearlike precision working tool 1 having abrasive flanks 12, 13, that is flanks which do not have any uniformly directed cutting edges. Screws 3 are provided for securing the tool 1 and the guide gear 2 together, which screws project through slotted holes 4 in the guide gear 2 and are held in place by nuts 5. Also, on the axially facing side of a gearlike dressing tool 6, the flanks 17, 18 of which are coated with CBN or diamond granules, there is secured a narrow guide pinion 7, namely by means of screws 8. A relative rotation between dressing tool 6 and guide pinion 7 is not intended, the tooth flanks of both parts remain always in the same position. In the example which is illustrated in FIG. 1, the precision working tool 1 is straight toothed and the dressing tool 6 is helically toothed. Also any other combination may be chosen. Further, one of the parts may be internally toothed with its guide gear or pinion, or both having the form of bevel gears.

The teeth on the precision working tool 1 and the dressing tool 6 move on rolling contact with one another. Their axes 11, 16 are crossed and spaced from one another. The common normal which extends perpendicularly to the axes 11, 16 (perpendicularly with respect to the drawing plane of FIG. 1) and through a pivot point 10. The shape of the precision working tool 1 and thus of the dressing tool 6 depends on the shape of the workpieces which are to be worked by the tool 1. The guide gear 2 remains functionless on the tool 1 during the precision working task.

Figure 2:
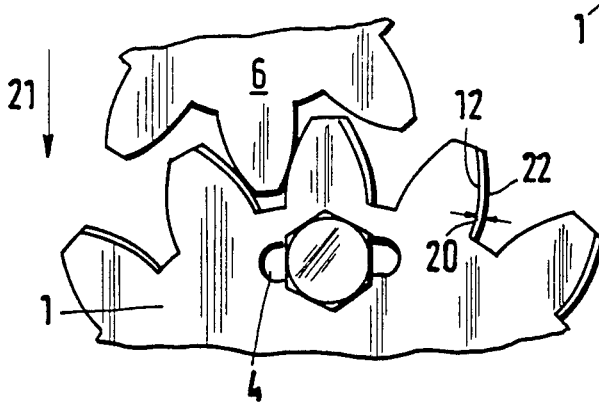
FIGS. 2 and 3 each illustrate a side view of the precision working tool, the guide gear being illustrated in different positions.
Figure 3:
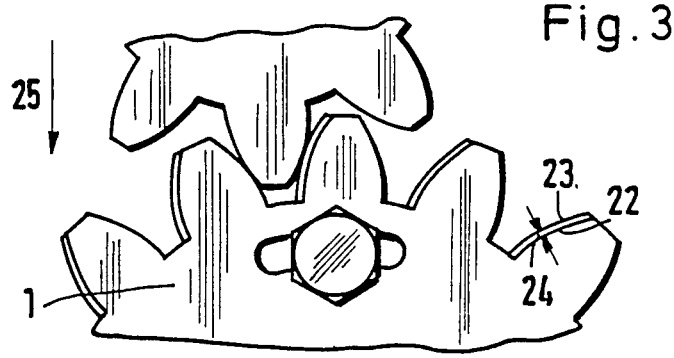

When the flanks 12, 13 of the precision working tool 1 must be dressed, then the guide gear 2, after loosening the screws 3, is rotated relative to the tool 1 until the flanks 12 on the tool 1 are circumferentially out of alignment an amount 20 (FIG. 2) relative to the flanks 22 on the guide gear 2, which amount corresponds to the amount of intended material removal. The screws 3 are again tightened. The precision working tool 1 is now brought into a meshing tooth engagement with the dressing tool 6 and rotated in a first direction of rotation to effect a desired amount of material removal from the tool 1. A feed movement in the direction of the arrow 21, namely, in the sense of a center distance reduction, also occurs until the guide gear 2 mates without backlash with the guide pinion 7. The precision working tool 1 is then removed from the machine. After the screws 3 are again loosened, the guide gear 2 is rotated relative to the tool 1 now in the opposite direction until the flanks 13 become circumferentially out of alignment with the flanks 23 by an amount 24 (FIG. 3) that corresponds with the amount of intended material removal. The screws 3 are again tightened and the precision working tool 1, reinserted into the machine, is brought into meshing tooth engagement with the dressing tool 6 and rotated in an opposite direction of rotation to effect the desired amount of material removal. A feed movement in the direction of the arrow 25 again takes place until the guide gear 2 mates without backlash with the guide pinion 7. During dressing of the flanks 13, it is also possible to work with the same direction of rotation as during dressing of the flanks 12, if for this purpose the dressing tool 6 and the precision working tool 1 are inserted into the machine the other way around, that is, rotated at 180° about the common normal.

If the engaging of tool 1 and dressing tool 6 occurs in an axial direction, the teeth of the guide gear 2 and/or of the guide pinion 7 can have at the axial tooth edge inclined surfaces or chamfers 26 or a rounded surface area 27 or the like, as this is illustrated in FIG. 1 on only one tooth of each of the guide gear 2 and guide pinion 7. With this the task of making the engagement is made easier and the risk of damaging the tooth edges, in particular the ones of the precision working tool 1, is reduced.

If the engagement of tool 1 and dressing tool 6 is effected in the radial direction, thus also in direction of the arrows 21 and 25, then a different contact pitch can be provided for the guide gear 2 and the guide pinion 7 than in the tool 1 and dressing tool 6. The amount 20, 24 is then determined in each case from a specific tooth of the guide gear 2, which tooth serves as a reference.

All parts which are not important for the invention, as for example the machine itself and the clamping, driving and feeding devices, are not illustrated in the drawings, since these parts are generally known to those of ordinary skill in this art area. If the precision working tool 1 and/or the dressing tool 6 are either internally toothed or conically shaped, then the dressing task of the flanks 12, 13 occurs in the same manner as is described above in connection with spur gears.

The embodiments of the invention in which an exclusive property or privilege is claimed are defined as follows:

1. In a gearlike tool for the precision working of the flanks of gears, the teeth of which have an abrasive surface free of any uniformly directed cutting edges, the improvement comprising wherein at least one guide gear is arranged in a coaxial relationship to said tool, wherein adjusting means are provided for permitting a relatively rotatably connection of said tool and said guide gear together to maintain said coaxial relationship and to prevent a relative rotation from occurring during a precision working task, wherein a guide pinion is arranged in a coaxial relationship to a dressing tool and wherein securement means are provided for fixedly and nonadjustably connecting said guide pinion and said dressing tool together to maintain said coaxial relationship, teeth on said guide gear meshingly engaging, during dressing, teeth on said guide pinion while teeth on said dressing tool simultaneously meshingly engage teeth on said tool, wherein said teeth of said guide gear, said guide pinion, said dressing tool and said tool extend axially, said teeth of said guide gear being adjustably angularly offset from said teeth on said tool a first distance to thereby limit the amount of material to be removed from said tool by said dressing tool as said teeth meshingly roll on each other.

2. A gearlike tool according to claim 1, wherein a number of teeth on said guide gear differs from a number of teeth on said tool, wherein a gear ratio between said guide gear and said guide pinion corresponds with a gear ratio between said precision working tool and said dressing tool.

3. A gearlike tool according to claim 1, wherein teeth on said guide gear have on an axial edge remote from said precision working tool at least one of a chamfered surface and a rounded surface area and the like.

4. A dressing tool with a metallic, gearlike constructed base member, the tooth flanks of which are coated with CBN or diamond granules, comprising at least one guide pinion arranged in axial direction next to said dressing tool and is fixedly connected against relative rotation, a guide gear arranged in axial direction next to a precision working tool which is to be dressed and adjusting means for relatively rotatably connecting said tool and said guide gear together, teeth on said guide gear meshingly engaging, during dressing, teeth on said guide pinion while teeth on said dressing tool simultaneously meshingly engage teeth on said tool, said teeth of said guide gear, said guide pinion, said dressing tool and said tool extend axially, said teeth of said guide gear being adjustably angularly offset from said teeth on said tool a first distance to thereby limit the amount of material to be removed from said tool by said dressing tool as said teeth meshingly roll on each other.

5. A dressing tool according to claim 4, wherein a number of teeth on said guide pinion differs from a number of teeth on said dressing tool, and wherein a gear ratio between said guide pinion and said guide gear corresponds with a gear ratio between said dressing tool and said precision working tool.

6. A dressing tool according to claim 4, wherein teeth on said guide pinion have on an axial edge remote from said dressing tool at least one of a chamfered surface and a rounded surface area and the like.

* * * * *